US011376872B2

(12) United States Patent
Sasaki

(10) Patent No.: US 11,376,872 B2
(45) Date of Patent: Jul. 5, 2022

(54) PRINTING APPARATUS AND METHOD OF CONTROLLING PRINTING APPARATUS

(71) Applicant: SEIKO EPSON CORPORATION, Tokyo (JP)

(72) Inventor: Tsutomu Sasaki, Kitaazumi-Gun Ikeda-Machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/130,239

(22) Filed: Dec. 22, 2020

(65) Prior Publication Data

US 2021/0197589 A1 Jul. 1, 2021

(30) Foreign Application Priority Data

Dec. 25, 2019 (JP) .............................. JP2019-234116

(51) Int. Cl.
*B41J 11/42* (2006.01)
*B41J 11/00* (2006.01)
*B41J 13/02* (2006.01)
*B41J 15/04* (2006.01)
*B65G 39/16* (2006.01)

(52) U.S. Cl.
CPC .............. *B41J 11/42* (2013.01); *B41J 11/007* (2013.01); *B41J 13/02* (2013.01); *B41J 15/048* (2013.01); *B65G 39/16* (2013.01)

(58) Field of Classification Search
CPC . B41J 11/42; B41J 11/007; B41J 13/02; B41J 15/048; B65G 39/16
See application file for complete search history.

(56) References Cited

U.S. PATENT DOCUMENTS

| | | | | |
|---|---|---|---|---|
| 2001/0055040 | A1* | 12/2001 | Nojima | B41J 11/42 347/16 |
| 2008/0218577 | A1* | 9/2008 | Suzuki | B41J 11/007 347/104 |
| 2014/0353126 | A1 | 12/2014 | Sengoku | |
| 2018/0099813 | A1* | 4/2018 | Bassi | B41J 11/007 |

FOREIGN PATENT DOCUMENTS

| | | | | |
|---|---|---|---|---|
| CN | 101359210 A | * | 2/2009 | ........ G03G 15/0131 |
| JP | 2018-514481 | | 6/2018 | |

* cited by examiner

*Primary Examiner* — Yaovi M Ameh
(74) *Attorney, Agent, or Firm* — Workman Nydegger

(57) ABSTRACT

A printing apparatus includes a printing unit that performs printing on a printing medium, a transporting belt that transports the printing medium and has an endless shape, and a belt-driving roller that causes the transporting belt to circulate and has a cylindrical shape. In the transporting belt, a magnetic scale having a magnetic pole changing at a predetermined pitch is arranged along a transport direction of the printing medium. The belt-driving roller includes an outer circumferential surface constituted of a magnet body, and is in contact with the transporting belt at the outer circumferential surface. The circumferential length of the outer circumferential surface of the belt-driving roller is an integer multiple of the pitch of the magnetic scale.

6 Claims, 8 Drawing Sheets

PRINTING APPARATUS AND METHOD OF CONTROLLING PRINTING APPARATUS

The present application is based on, and claims priority from JP Application Serial Number 2019-234116, filed Dec. 25, 2019, the disclosure of which is hereby incorporated by reference herein in its entirety.

BACKGROUND

1. Technical Field

The present disclosure relates to a printing apparatus and a method of controlling the printing apparatus.

2. Related Art

Hitherto, there has been known a printing apparatus in which a magnetic marker is embedded in a belt that transports a printing medium and a position of the belt is determined by a detector that detects the magnetic marker (for example, see JP 2018-514481 T). In the configuration in JP 2018-514481 T, the belt is brought into contact with a pulley or a roller, and is transported by a transporting device.

In the configuration in which the belt is transported through use of the pulley, the roller, or the like constituted of a magnet body formed of metal or the like, a member of the magnetic body and the magnet marker provided in the belt are close to each other, or are brought into contact with each other. Thus, it is conceived that magnetic actions are caused between the magnetic body and the magnetic marker. In order to prevent influence of the magnetic actions, the pulley, the roller, or the like is preferably constituted of a non-magnetic body, but is constituted of a magnetic body in some cases in consideration of durability and facilitation during manufacturing. In this case, in a case where the belt is used for a long time period, when the magnetic actions change a magnetic force of the magnetic marker, it is concerned that the position detection of the belt through use of the magnetic marker is affected.

SUMMARY

In order to solve the above-mentioned problem, a printing apparatus according to one aspect includes a printing unit configured to perform printing on a printing medium, a transporting belt configured to transport the printing medium, the transporting belt having an endless shape, and a roller configured to cause the transporting belt to circulate, the roller having a cylindrical shape, wherein a magnetic scale is arranged at the transporting belt along a transport direction of the printing medium, the magnetic scale having a magnetic pole changing at a predetermined pitch, the roller has an outer circumferential surface constituted of a magnetic body, and is in contact with the transporting belt at the outer circumferential surface, and a circumferential length of the outer circumferential surface of the roller is an integer multiple of a pitch of the magnetic scale.

In order to solve the above-mentioned problem, a printing apparatus according to another aspect includes a printing unit configured to perform printing on a printing medium, a transporting belt configured to transport the printing medium, the transporting belt having an endless shape, and a roller configured to cause the transporting belt to circulate, the roller having a cylindrical shape, wherein a magnetic scale is arranged at the transporting belt along a transport direction of the printing medium, the magnetic scale having a magnetic pole changing at a predetermined pitch, the roller has an outer circumferential surface constituted of a magnetic body, and is in contact with the transporting belt at the outer circumferential surface, and Expression (1) given below is satisfied where the pitch of the magnetic scale is P.

$$P = p \cdot q \quad (1)$$

Note that, in Expression (1) given above, p is a positive integer, and q is an approximate value of the number n.

In order to solve the above-mentioned problem, a printing apparatus according to another aspect includes a printing unit configured to perform printing on a printing medium, a transporting belt configured to transport the printing medium, the transporting belt having an endless shape, a roller configured to cause the transporting belt to circulate, the roller having a cylindrical shape, including an outer circumferential surface constituted of a magnetic body, and being in contact with the transporting belt at the outer circumferential surface, and a control unit configured to control an operation of the roller, wherein a magnetic scale is arranged at the transporting belt along a transport direction of the printing medium, the magnetic scale having a magnetic pole changing at a predetermined pitch, and when the transporting belt is stopped, the control unit executes a position adjustment operation for adjusting relative positions of the outer circumferential surface of the roller and the transporting belt, and then stops the roller.

In order to solve the above-mentioned problem, a method according to another aspect is for controlling a printing apparatus, the printing apparatus including a printing unit configured to perform printing on a printing medium, a transporting belt configured to transport the printing medium, the transporting belt having an endless shape, and a roller configured to cause the transporting belt to circulate, the roller having a cylindrical shape, including an outer circumferential surface constituted of a magnetic body, and being in contact with the transporting belt at the outer circumferential surface, wherein the printing apparatus has a configuration in which a magnetic scale is arranged at the transporting belt along a transport direction of the printing medium, the magnetic scale having a magnetic pole changing at a predetermined pitch, and when the transporting belt is stopped, a position adjustment operation for adjusting relative positions of the outer circumferential surface of the roller and the transporting belt is executed, and then the transporting belt is stopped.

DESCRIPTION OF EXEMPLARY EMBODIMENTS

Exemplary embodiments to which the present disclosure is applied are described below with reference to the drawings. Note that, in each drawing, for convenience of understanding, each member is illustrated in a scale different from reality.

Figure 1:
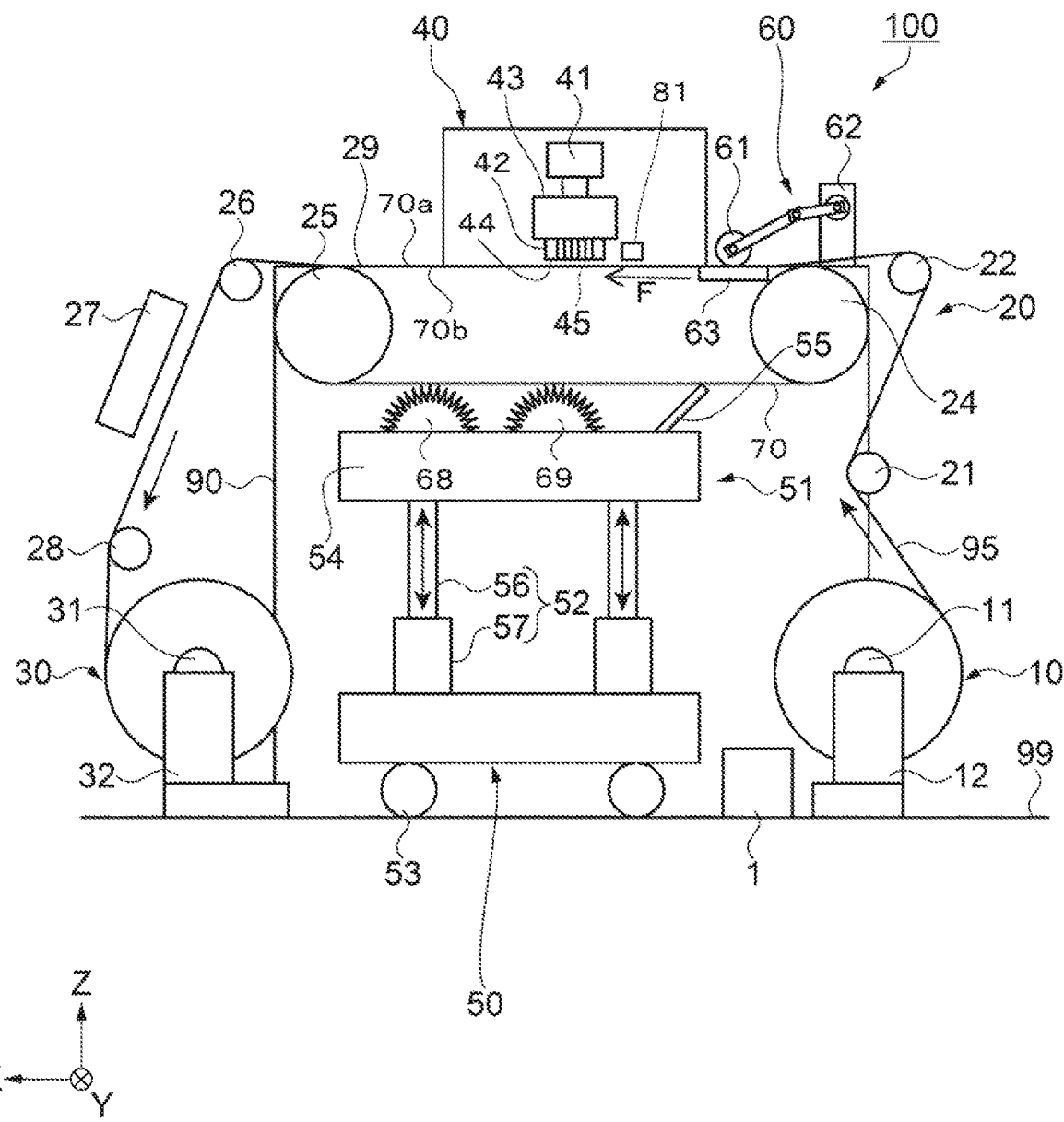
FIG. 1 is a schematic configuration view of a printing apparatus.

In FIG. 1, an X-axis, a Y-axis, and a Z-axis are illustrated as three axes orthogonal to one another for convenience of description. In an installation state of a printing apparatus 100, the Z-axis corresponds to a vertical direction, and the X-axis and the Y-axis are directions along a horizontal plane.

1. First Exemplary Embodiment

1-1. Overall Configuration of Printing Apparatus

FIG. 1 is a schematic configuration view of the printing apparatus 100.

The printing apparatus 100 is an ink jet-type printing apparatus that forms an image by ejecting ink onto a printing medium. As a printing medium 95 used in the printing apparatus 100, sheets formed of various materials such as paper and a synthetic resin may be used. For example, a paper sheet dedicated for ink jet recording such as plain paper, wood-free paper, and coated paper may be used. In the following description, a configuration in which, as the printing medium 95, a fiber cloth formed of natural fibers such as cotton and wool, synthetic fibers such as polyester, or fibers obtained by mixing those is used is given. The printing apparatus 100 functions as a textile printer that performs textile printing on the printing medium 95 by causing ink to adhere to a printing surface of the printing medium 95. The printing medium 95 corresponds to a material on which printing is performed.

The printing apparatus 100 includes a medium transport unit 20, a medium fitting unit 60, a printing unit 40, a drying unit 27, a cleaning unit 50, and the like, and each of those units is mounted to a frame portion 90. The printing apparatus 100 includes a control device 1 that controls the units described above.

The medium transport unit 20 includes a medium feeding portion 10, transporting rollers 21 and 22, a belt-rotated roller 24, a belt-driving roller 25, transporting rollers 26 and 28, a medium collecting portion 30, and a transporting belt 70, and transports the printing medium 95 in a transport direction. The transport direction in which the medium transport unit 20 transports the printing medium 95 is a transport direction F indicated with the arrows in the drawings, and corresponds to the +X-axis direction in the printing unit 40. The belt-rotated roller 24 and the belt-driving roller 25 correspond to an example of a roller.

The medium feeding portion 10 feeds the printing medium 95 to the printing unit 40 side. The medium feeding portion 10 includes a cylindrical or columnar feeding shaft 11 and a bearing 12 that rotatably supports the feeding shaft 11. The medium feeding portion 10 includes a rotary driving portion (not shown) that drives the feeding shaft 11 in accordance with control of the control device 1. The band-like printing medium 95 in a roll shape is wound about the feeding shaft 11, and the printing medium 95 is fed out when the feeding shaft 11 rotates. The feeding shaft 11 is removably mounted to the bearing 12.

The transporting rollers 21 and 22 relay the printing medium 95, which is fed from the feeding shaft 11, to the transporting belt 70.

The transporting belt 70 transports the printing medium 95 in the transport direction F. The transporting belt 70 has an endless shape in which both ends of the band-like belt are joined to each other, and is wound about the belt-rotated roller 24 and the belt-driving roller 25. For example, the transporting belt 70 is retained under a state in which a predetermined tensile force acts thereon in such a way that a part between the belt-rotated roller 24 and the belt-driving roller 25 is parallel to a floor 99. On a surface 70a of the transporting belt 70, an adhesive layer 29 adhering to the printing medium 95 is provided.

The printing medium 95 is transported to the transporting belt 70 via the transporting roller 22, is brought into close contact with the surface 70a with an adhesive force of the adhesive layer 29, and is supported or retained by the transporting belt 70. With this, a stretchable fiber cloth and the like may be handled as the printing medium 95.

Each of the belt-rotated roller 24 and the belt-driving roller 25 is a magnetic roller having a surface held in contact with the transporting belt 70. The surface is constituted of a magnetic body such as iron. Only a part, which includes the surface held in contact with the transporting belt 70, of the magnetic roller may be a magnetic body, and the entire magnetic roller is not required to be a magnetic body. For example, there may be adopted a roller obtained by arranging a tube constituted of a magnetic body in a periphery of a shaft constituted of a non-magnetic body.

Figure 3:
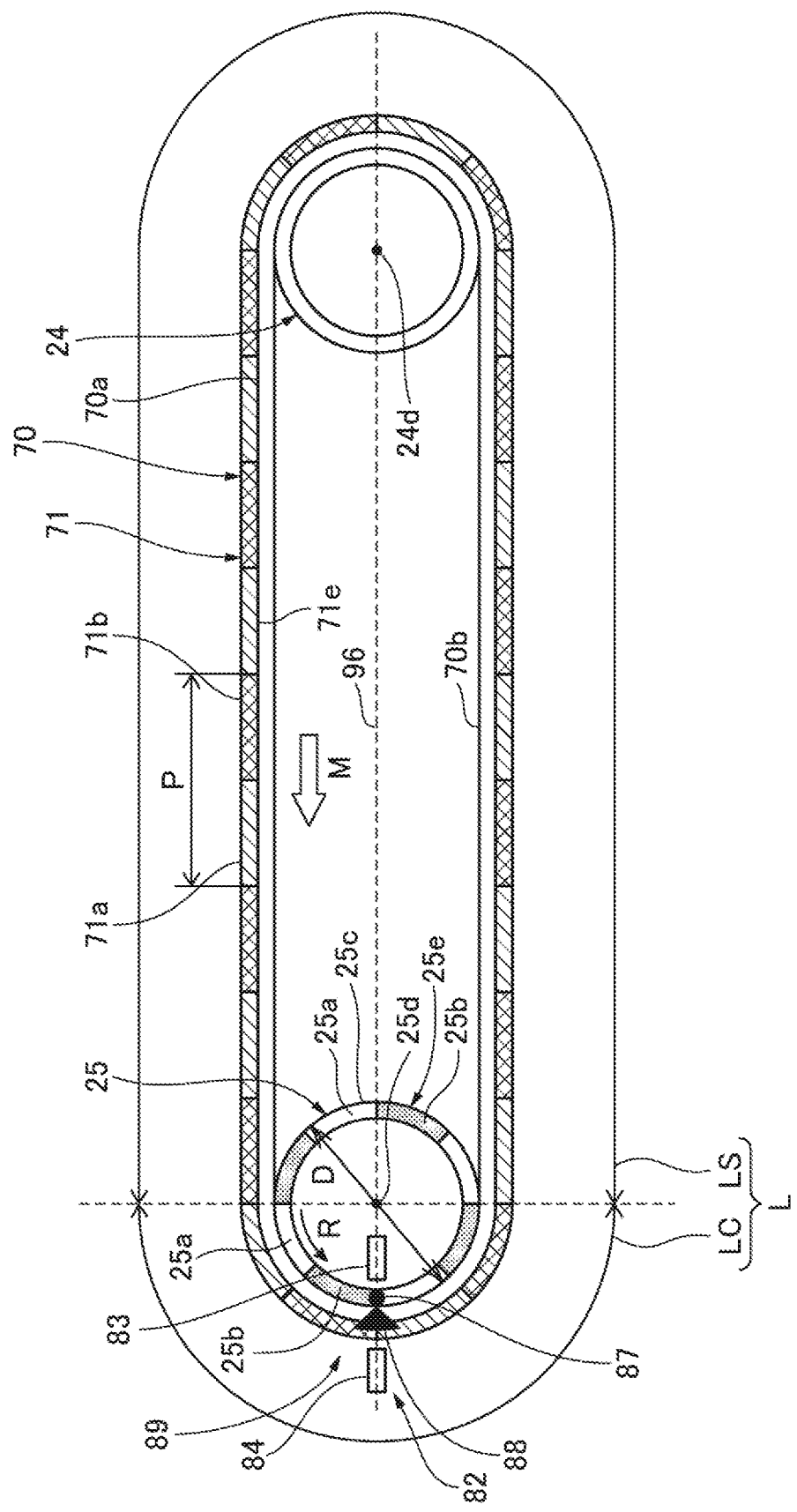
FIG. 3 is a schematic view illustrating arrangement of the transporting belt and belt-driving rollers.

In the present exemplary embodiment, at least a part, which includes an outer circumferential surface 25c illustrated in FIG. 3, of the belt-driving roller 25 is only required to be constituted of a magnetic body. The entire belt-driving roller 25 may be constituted of magnetic body. This also applies to the belt-rotated roller 24.

The belt-rotated roller 24 and the belt-driving roller 25 are held in contact with an inner circumferential surface 70b of the transporting belt 70, and drives the transporting belt 70 due to friction with the inner circumferential surface 70b of the transporting belt 70. A support portion that supports the transporting belt 70 may be provided between the belt-rotated roller 24 and the belt-driving roller 25 in the transport direction F.

The belt-driving roller 25 is coupled to a motor (not shown), and rotates with a driving force of the motor. The belt-rotated roller 24 is a driven roller. When the transporting belt 70 moves along in accordance with rotation of the belt-driving roller 25, the belt-rotated roller 24 rotates in accordance with the motion of the transporting belt 70. The transporting belt 70 moves to circulate through a transport path in a loop shape as illustrated in the drawing. In accordance with motion of the transporting belt 70, the printing medium 95 is transported to the transport direction F.

The printing unit 40 is positioned on the upper side of the transporting belt 70, and faces the surface 70a of the transporting belt 70. On the lower side of the transporting belt 70, the cleaning unit 50 is arranged. At the position facing the printing unit 40, the transporting belt 70 moves together with the printing medium 95 in the transport direction F. At the position facing the cleaning unit 50, the transporting belt 70 moves in the direction opposite to the transport direction F.

The printing unit 40 forms an image on the printing medium 95. The transporting roller 26 is positioned on downstream of the printing unit 40 in the transport direction F, and causes the printing medium 95 to peel off from the adhesive layer 29. The printing medium 95 is transported to the medium collecting portion 30 via the transporting roller 26 and the transporting roller 28.

The medium collecting portion 30 collects the printing medium 95. The medium collecting portion 30 includes a cylindrical or columnar winding shaft 31 and a bearing 32 that rotatably supports the winding shaft 31. The medium collecting portion 30 includes a rotary driving portion (not shown) that rotationally drives the winding shaft 31. When the winding shaft 31 rotates, the printing medium 95 is wound about the winding shaft 31. The winding shaft 31 is removably mounted to the bearing 32.

The medium fitting unit 60 is positioned upstream of the printing unit 40 in the transport direction F, and brings the printing medium 95 into close contact with the transporting belt 70. The medium fitting unit 60 includes a press roller 61, a press roller driving portion 62, and a roller support portion 63. The press roller 61 is formed in a cylindrical or columnar shape, and is rotatable in a circumferential direction. The roller support portion 63 is arranged on the inner circumferential surface 70b side of the transporting belt 70 in such a way to face the press roller 61 across the transporting belt 70.

The press roller driving portion 62 causes the press roller 61 to move in the transport direction F and the direction opposite to the transport direction F while pressing the press roller 61 downward. A pressing force of the press roller driving portion 62 presses the printing medium 95 against the transporting belt 70 between the press roller 61 and the roller support portion 63.

The printing unit 40 includes an ejection head 42 that ejects ink onto the printing medium 95, a carriage 43 on which the ejection head 42 is mounted, and a carriage moving section 41 that causes the carriage 43 to move in a direction intersecting the transport direction F. The ejection head 42 includes a nozzle plate 44 on which a plurality of nozzle rows 45 are formed. For example, four nozzle rows 45 are formed on the nozzle plate 44, and ink of different colors corresponding to the respective nozzle rows 45 is ejected. With this, color printing is performed on the printing medium 95.

The carriage 43 is supported by a guide rail (not shown) arranged along the Y-axis direction, and is caused to reciprocate in the Y-axis direction by the carriage moving section 41. For the mechanism of the carriage moving section 41, for example, a mechanism including a combination of a ball screw and a ball nut and a linear guide mechanism may be adopted.

The drying unit 27 is provided between the transporting roller 26 and the transporting roller 28. The drying unit 27 includes a heating means such as an IR heater, and dries ink on the printing medium 95 by heating the printing medium 95.

The cleaning unit 50 includes a cleaning section 51, a pressing section 52, and a moving section 53. The cleaning section 51 includes a cleaning tank 54 that stores cleaning liquid, a first cleaning brush 68 and a second cleaning brush 69 that abut on the transporting belt 70 and rotate, and a downstream blade 55. By abutting on the surface 70a of the transporting belt 70 and rotating, the first cleaning brush 68 and the second cleaning brush 69 perform cleaning on the surface 70a with the cleaning liquid. The downstream blade 55 is formed of a flexible material such as silicon rubber, and is arranged downstream of the second cleaning brush 69 in the moving direction of the transporting belt 70. The downstream blade 55 scrapes the cleaning liquid off from the surface 70a, and obtains a state under which the printing medium 95 can be brought into close contact with the surface 70a.

The moving section 53 supports the cleaning unit 50 in such a way to move with respect to the floor 99. The pressing section 52 is a lifting device including, for example, an air cylinder 56 and a ball bush 57, and is capable adjusting and retaining the height of the cleaning section 51.

1-2. Configurations of Transporting Belt and Reading Head

Figure 2:
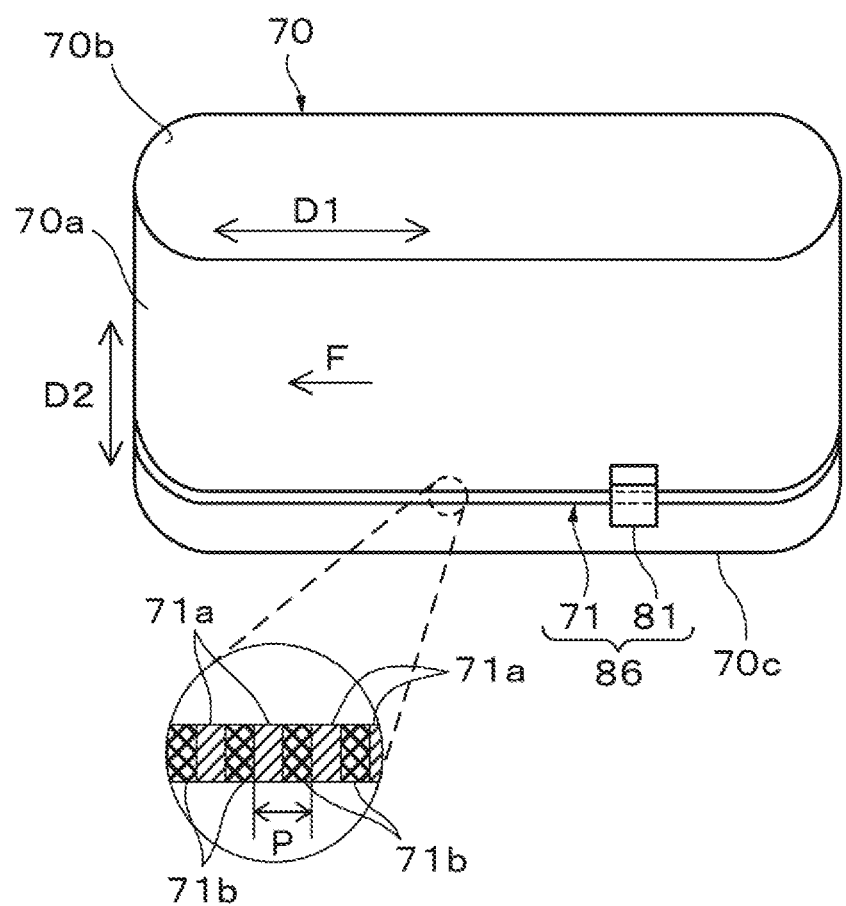
FIG. 2 is a perspective view illustrating a transporting belt and a reading head.

FIG. 2 is a perspective view illustrating the transporting belt 70 and a reading head 81, an illustrates a part of a magnetic scale 71 in a circle in an enlarged manner.

The transporting belt 70 is formed in an endless shape by joining both ends of a band-like sheet. A direction of the transporting belt 70, which extends along the transport direction F, corresponds to a first direction D1, and a direction intersecting the first direction D1 corresponds to a second direction D2. In the present exemplary embodiment, the second direction D2 is orthogonal to the first direction D1, and corresponds to the width direction of the transporting belt 70.

In the transporting belt 70, the magnetic scale 71 is arranged along the first direction D1. The magnetic scale 71 is arranged close to one side edge 70c in the second direction D2.

The magnetic scale 71 has a configuration in which parts having different magnetic states are alternately arrayed in the first direction D1. As an example in the present exemplary embodiment, a configuration in which magnetic bodies 71a and 71b being magnetic regions are alternately arrayed in the first direction D1 is illustrated. The magnetic body 71a and the magnetic body 71b have polarity patterns different from each other on surfaces facing the reading head 81 described later. For example, on the surface 70a, the magnetic body 71a has an N pole, and the magnetic body 71b has an S pole. The polarity patterns of the magnetic body 71a and the magnetic body 71b may be opposite to those described above, or a configuration in which any one of the magnetic body 71a and the magnetic body 71b has no polarity may be adopted. The magnetic scale 71 is formed by, for example, magnetizing a series of magnetic tape or film. However, members being the magnetic bodies 71a and 71b may be arranged to be arrayed.

The magnetic scale 71 may be exposed on the surface 70a of the transporting belt 70, may be exposed on the inner circumferential surface 70b of the transporting belt 70, or may be embedded in the transporting belt 70. In the example illustrated in FIG. 2, the magnetic scale 71 is exposed on the surface 70a of the transporting belt 70.

The printing apparatus 100 includes the reading head 81 that reads the magnetic scale 71 of the transporting belt 70. The reading head 81 is a magnetic liner encoder that detects magnetism of the magnetic scale 71 moving in the transport direction F. When the transporting belt 70 moves along rotation of the belt-driving roller 25, a magnetic pole detected by the reading head 81 is inversed at the boundary between the magnetic body 71a and the magnetic body 71b, and a detection signal DS varies. The control device 1 counts how many times the magnetic pole is inverted, based on the detection signal DS of the reading head 81. With this, a moving amount of the transporting belt 70 can be obtained. In the following description, the moving amount of the transporting belt 70 is referred to as a transported amount. The magnetic scale 71 and the reading head 81 constitute a position detection device 86 that detects a position of the transporting belt 70.

The reading head 81 reads the magnetic scale 71 on the surface 70a, and hence is arranged on the upper side of the transporting belt 70 in FIG. 1. The reading head 81 is preferably at a position close to the surface 70a in the Z-axis direction. The reading head 81 is preferably away from the surface 70a in such a way to be prevented from being brought into contact with the adhesive layer 29. However, when the magnetic scale 71 is present at a position overlapping the printing medium 95, the reading head 81 may be brought into contact with the printing medium 95.

A length of the magnetic body 71a and the magnetic body 71b in the magnetic scale 71, that is, a length unit by which magnetism read by the reading head 81 is inverted is referred to as a pitch. The pitch is indicated with a reference symbol P in the circle of FIG. 2. In the magnetic scale 71, the magnetic bodies 71a and the magnetic bodies 71b are alternately arranged at the pitch P. The pitch P of the magnetic scale 71 is set to a predetermined value, and functions as a reference in processing in which the control device 1 calculates a transported amount based on an output signal from the reading head 81.

1-3. Relative Positions of Belt Driving Roller and Magnetic Scale

FIG. 3 is a schematic view illustrating arrangement of the transporting belt 70 and the belt-driving roller 25.

In FIG. 3, the direction in which the transporting belt 70 moves is indicated as a moving direction M. A reference symbol D indicates an outer diameter of the belt-driving roller 25. An axial center of the belt-rotated roller 24 is indicated with a reference symbol 24d, and an axial center of the belt-driving roller 25 is indicated with a reference symbol 25d. Further, an imaginary straight line 96 passing through the axial center 24d and the axial center 25d is indicated with a broken line. Further, a rotation direction of the belt-driving roller 25 is indicated with a reference symbol R.

The transporting belt 70 stretches about the belt-rotated roller 24 and the belt-driving roller 25, and moves to circulate through the transport path in a loop shape. The transporting belt 70 is brought into contact with substantially the half of the outer circumferential surface 25c of the belt-driving roller 25. The magnetic scale 71 has an endless shape similarly to the transporting belt 70, and is held in contact with the outer circumferential surface 25c of the belt-driving roller 25. Here, a length of a part of the magnetic scale 71, which is held in contact with the outer circumferential surface 25c, is indicated with a reference symbol LC, and a length of the other part is indicated with a reference symbol LS. The total of the length LC and the length LS corresponds to a length L of the magnetic scale 71.

The magnetic scale 71 is embedded in the transporting belt 70, and hence the magnetic scale 71 is not always held in direct contact with the outer circumferential surface 25c. However, it can be said that a distance between the magnetic scale 71 and the outer circumferential surface 25c is negligibly small.

In the belt-driving roller 25, an outer circumferential part 25e including the outer circumferential surface 25c is constituted of a magnetic body. The outer circumferential part 25e is brought into contact with or close to the magnetic scale 71, and hence is magnetized due to a magnetic force of the magnetic scale 71. For example, under a state in which the transporting belt 70 is stopped due to operation stop of the printing apparatus 100 or the like, relative positions of the magnetic scale 71 and the outer circumferential surface 25c are not changed. Thus, the part of the outer circumferential part 25e, which is close to the magnetic scale 71, is continuously affected by a magnetic force of the magnetic scale 71, and hence is likely to be magnetized. The outer circumferential part 25e is magnetized correspondingly to a magnetic pole of the magnetic body 71a at a position facing the magnetic body 71a, and is magnetized correspondingly to a magnetic pole of the magnetic body 71b at a position facing the magnetic body 71b. This also applied to the belt-rotated roller 24. For simplification of the description, description on the belt-rotated roller 24 is omitted. In the following description, description on the belt-rotated roller 24 is also omitted.

It is assumed that a part of the outer circumferential part 25e, which is magnetized correspondingly to the magnetic body 71a, is a first magnetic part 25a and that a part thereof, which is magnetized to be an S pole, is a second magnetic part 25b. The first magnetic parts 25a and the second magnetic parts 25b are alternately caused in the outer circumferential surface 25c at the same pitch as the magnetic bodies 71a and 71b in a circumferential direction of the belt-driving roller 25.

While the belt-driving roller 25 is stopped, a state in which the magnetic body 71a faces the first magnetic part 25a and the magnetic body 71b faces the second magnetic part 25b is maintained. While the belt-driving roller 25 drives the transporting belt 70, each of the plurality of first magnetic parts 25a and the plurality of second magnetic parts 25b formed on the outer circumferential part 25e is repeatedly in a state being close to the magnetic scale 71 and a state being away from the magnetic scale 71.

When the relative positions of the belt-driving roller 25 and the transporting belt 70 are changed along with motion of the transporting belt 70, the relative positions of the magnetic body 71a and the first magnetic part 25a and the relative positions of the magnetic body 71b and the second magnetic part 25b are deviated. With this, when the magnetic body 71a and the second magnetic part 25b, which have magnetic states that do not correspond to each other, face each other, an action of weakening both the magnetic forces is caused. This also applies to a case where the magnetic body 71b and the first magnetic part 25a face each other. When the magnetic forces of the magnetic bodies 71a and 71b of the magnetic scale 71 are weakened, it is concerned that this action may affect detection of the magnetic scale 71, which is performed by the reading head 81.

In the printing apparatus 100, a configuration in which the magnetic pole of the magnetic scale 71 abutting on the outer circumferential surface 25c is maintained to a constant magnetic pole. Specifically, the magnetic body 71a is always close to the first magnetic part 25a, and the second magnetic part 25b is always close to the magnetic body 71b. In other words, basically, a configuration in which the magnetic body 71b is not close to the first magnetic part 25a and the magnetic body 71a is not close to the second magnetic part 25b is adopted.

As a first specific configuration example, given is a case where the circumferential length of the outer circumferential surface 25c corresponds to an integer multiple of the pitch P of the magnetic bodies 71a and 71b of the magnetic scale 71. The circumferential length of the outer circumferential surface 25c corresponds to a length by which the magnetic scale 71 is transported during one rotation of the belt-driving roller 25. In this configuration example, the boundary between the magnetic body 71a and the magnetic body 71b and the boundary between the first magnetic part 25a and the second magnetic part 25b are not deviated from each other while the belt-driving roller 25 rotates. Thus, even when the belt-driving roller 25 rotates, the magnetic pole of the magnetic scale 71 abutting on the outer circumferential surface 25c does not change.

As a second specific configuration example exerting similar effects, given is a case where the pitch P of the magnetic scale 71 satisfies Expression (1) given below.

$$P = p \cdot q \quad (1)$$

In Expression (1) given above, p is a positive integer, and q is an approximate value of the number n.

In this configuration example, a multiple relationship is established between the circumferential length of the outer circumferential surface 25c and the pitch P. Thus, similarly to the first configuration example, the boundary between the magnetic body 71a and the magnetic body 71b and the boundary between the first magnetic part 25a and the second magnetic part 25b are not deviated from each other while the belt-driving roller 25 rotates. Thus, even when the belt-driving roller 25 rotates, the magnetic pole of the magnetic scale 71 abutting on the outer circumferential surface 25c does not change.

Further, the length L of the magnetic scale 71 is preferably an integer multiple of the pitch P. In this case, even when the belt-driving roller 25 rotates, the magnetic pole of the magnetic scale 71 abutting on the outer circumferential surface 25c does not change. Thus, it can be expected that such effect can be more securely exerted.

Further, each of the magnetic scale 71 and the belt-driving roller 25 may have a configuration corresponding to both the first configuration example and the second configuration example.

When the printing apparatus 100 is operated, relative positions of the belt-driving roller 25 and the transporting belt 70 may be deviated in some cases. For example, due to a tensile force applied to the transporting belt 70, the transporting belt 70 moves relatively with respect to the belt-driving roller 25 in some cases. Further, for example, due to change in temperature or the like, the length of the transporting belt 70 varies, or warpage of the belt-driving roller 25 in the axis direction is caused in some cases. For those reasons, the transporting belt 70 moves relatively with respect to the belt-driving roller 25 in some cases. In this case, relative positions of the magnetic scale 71 and the outer circumferential surface 25c are changed. This change is referred to as position deviation, and a changed amount of the relative positions is referred to as a deviation amount. The position deviation is the change of the relative positions of the magnetic scale 71 and the outer circumferential surface 25c, and is also the change of the relative positions of the transporting belt 70 and the belt-driving roller 25.

The printing apparatus 100 has a configuration of detecting the position deviation between the transporting belt 70 and the belt-driving roller 25. Specifically, the printing apparatus 100 includes a roller position detector 83 that detects a rotation position of the belt-driving roller 25 and a belt position detector 84 that detects a position of a position of the transporting belt 70 in the moving direction M. A roller position indicator 87 is provided to the belt-driving roller 25, and a belt position indicator 88 is provided to the transporting belt 70.

The roller position indicator 87 is a marker, which is provided to one position or a plurality of positions on the outer circumferential part 25e and indicates a specific position of the outer circumferential part 25e in the circumferential direction. In the present exemplary embodiment, the roller position indicator 87 is provided at one position on the outer circumferential part 25e in the circumferential direction. The roller position indicator 87 is attached or printed onto the outer circumferential surface 25c, but the roller position indicator 87 may be formed as a recessed part or a protruding part of the outer circumferential part 25e.

The roller position detector 83 is a sensor that detects the roller position indicator 87, and is fixed to, for example, a frame 90 in such a way to be prevented from moving even when the belt-driving roller 25 rotates. For example, when given is a configuration in which the roller position indicator 87 can be detected optically, the roller position detector 83 is constituted of a reflection-type optical sensor. Further, when the roller position indicator 87 is constituted of a recessed or a protruding part of the outer circumferential surface 25c, the roller position detector 83 may be an optical sensor that optically detects the roller position indicator 87. Alternatively, the roller position detector 83 may be a switch-type sensor that detects the roller position indicator 87 through contact. The roller position detector 83 outputs a detection signal DS1 to the control device 1 described later. For example, the detection signal DS1 is a voltage value or digital data, which varies in accordance with a detection state of the roller position detector 83. When the roller position indicator 87 arrives at a position detected by the roller position detector 83 along with rotation of the belt-driving roller 25, the detection signal DS1 varies.

The belt position indicator 88 is a marker that indicates a specific position of the transporting belt 70 in the motion path of the transporting belt 70. In the present exemplary embodiment, given is an example in which the belt position indicator 88 is provided at one position in the loop-shaped motion path of the transporting belt 70, but the belt position indicator 88 may be provided at a plurality of positions. The belt position indicator 88 is attached or printed onto the surface 70a or the inner circumferential surface 70b of the transporting belt 70, but the belt position indicator 88 may be formed as a recessed part, a protruding part, or a through hole in a part of the transporting belt 70.

The belt position detector 84 is a sensor that detects the belt position indicator 88, and is fixed to, for example, the frame 90 in such a way to be prevented from moving even when the transporting belt 70 moves. For example, when given is a configuration in which the belt position indicator 88 can be detected optically, the belt position detector 84 is constituted of a reflection-type optical sensor. Further, the belt position indicator 88 is constituted of a recessed part, a protruding part, or a through hole, the belt position detector 84 may be an optical sensor that optically detects the belt position indicator 88 or may be a switch-type sensor that detects the belt position indicator 88 through contact. The belt position detector 84 outputs a detection signal DS2 to the control device 1 described later. For example, the detection signal DS2 is a voltage value or digital data, which varies in accordance with a detection state of the belt position detector 84. When the belt position indicator 88 arrives at a position detected by the belt position detector 84 along with rotation of the belt-driving roller 25, the detection signal DS2 varies.

The roller position detector 83 and the belt position detector 84 are fixed in such a way that the relative positions do not vary. In the example of FIG. 3, the roller position detector 83 and the belt position detector 84 are arranged on the straight line 96 passing through the axial centers 24d and 25d. That is, the roller position detector 83 and the belt position detector 84 face each other along the straight line 96.

While the belt-driving roller 25 is operated and the transporting belt 70 performs one rotation in the motion path, the control device 1 acquires a timing at which the roller position detector 83 detects the roller position indicator 87 and a timing at which the belt position detector 84 detects the belt position indicator 88. A difference between those timings indicates the relative positions of the outer circumferential surface 25c and the magnetic scale 71. That is, when a time difference between the timing at which the roller position detector 83 detects the roller position indicator 87 and the timing at which the belt position detector 84 detects the belt position indicator 88 varies, it can be determined that the relative positions of the outer circumferential surface 25c and the magnetic scale 71 vary.

The roller position indicator 87 and the belt position indicator 88 may be indicators that can be visually recognized by an operator operating the printing apparatus 100. In this case, during installation or manufacturing work of the printing apparatus 100, positioning can be performed through use of the roller position indicator 87 and the belt position indicator 88.

For example, when use of the printing apparatus 100 is started or adjustment is completed by a maintenance worker, it is conceived that the relative positions of the transporting belt 70 and the belt-driving roller 25 are set as reference arrangement. As the reference arrangement, for example, given is a state in which the roller position indicator 87 is at the position detected by the roller position detector 83 and the belt position indicator 88 is at the position detected by the belt position detector 84. In this case, in the circumferential direction of the belt-driving roller 25, the roller position detector 83, the belt position detector 84, the roller position indicator 87, and the belt position indicator 88 are at the same position. The roller position indicator 87 and the belt position indicator 88 function as alignment marks for positioning. When the relative positions of the transporting belt 70 and the belt-driving roller 25 are deviated due to an operation of the printing apparatus 100, an operator can recognize the deviation by visually recognizing the positions of the roller position detector 83 and the belt position detector 84. Further, work operated by the operator for canceling the deviation is facilitated. Further, the timing at which the roller position detector 83 detects the roller position indicator 87 and the timing at which the belt position detector 84 detects the belt position indicator 88 match each other. Thus, the control device 1 can detect the position deviation with simple processing.

Figure 4:
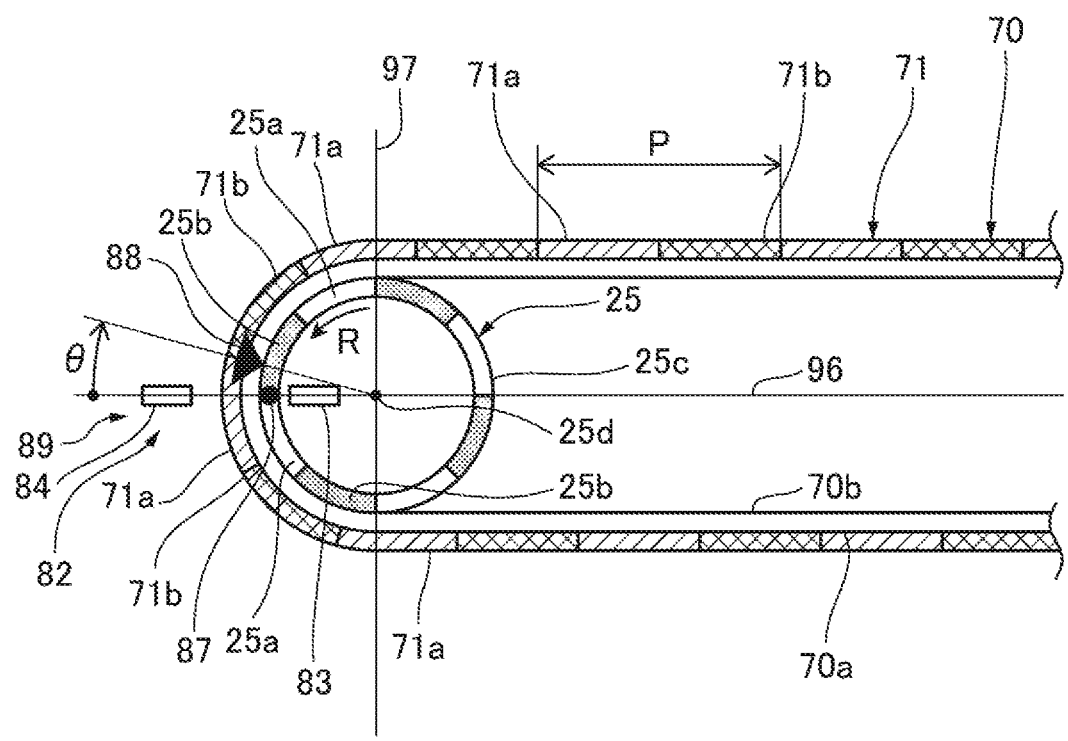
FIG. 4 is an explanatory view of position deviation between the transporting belt and the belt-driving roller.

FIG. 4 is an explanatory view of the position deviation between the transporting belt 70 and the belt-driving roller 25.

FIG. 4 illustrates an example under a state in which the position deviation is caused between the relative positions of the transporting belt 70 and the belt-driving roller 25. In the initial state, as illustrated in, for example, FIG. 3, when the roller position indicator 87 is positioned at the position detected by the roller position detector 83, a configuration in which the belt position indicator 88 is at the position detected by the belt position detector 84 is assumed. Under the state of FIG. 4, when the roller position indicator 87 is at the position detected by the roller position detector 83, the belt position indicator 88 is away from the position detected by the belt position detector 84. When the position deviation is expressed with a rotational angle of the belt-driving roller 25, an angle θ is formed.

When the transporting belt 70 is stopped for a long time period under the state in FIG. 4, the first magnetic part 25a and the magnetic body 71b face each other, and the second magnetic part 25b and the magnetic body 71a face each other. Thus, as described above, it is concerned that the magnetic forces of the magnetic bodies 71a and 71b are weakened.

Details thereof are described later, but the control device 1 is capable of executing a position adjustment operation for canceling or correcting the deviation. For example, when the printing apparatus 100 executes printing, printing is completed, and motion of the transporting belt 70 is stopped, the control device 1 executes the position adjustment operation.

Further, as another operation, the control device 1 executes the position adjustment operation in accordance with a rotation amount by which the belt-driving roller 25 rotates when the belt-driving roller 25 is operated while the printing apparatus 100 executes printing, for example.

Further, in a case where the angle θ is allowably small, even when the transporting belt 70 is stopped for a long time period under a state of FIG. 4, it can be said that a risk of weakening the magnetic forces of the magnetic bodies 71a and 71b is low.

When the belt-driving roller 25 rotates at the angle θ from the state of FIG. 4, the belt position indicator 88 arrives at the position detected by the belt position detector 84. Based on the timing at which the roller position detector 83 detects the roller position indicator 87 and the timing at which the belt position detector 84 detects the belt position indicator 88, the control device 1 calculates a time difference between the detection timings. Based on the calculated time difference and a rotational speed of the belt-driving roller 25, the control device 1 can obtain the angle θ. That is, the deviation amount, which is expressed with the rotational angle of the belt-driving roller 25, can be obtained. Further, based on the angle θ and a diameter of the belt-driving roller 25, the control device 1 may calculate the deviation amount as the length of the magnetic scale 71.

In this case, for example, when the obtained deviation amount exceeds a set range, the control device 1 executes the position adjustment operation for canceling or correcting the deviation described later.

1-4. Control System of Printing Apparatus

Figure 5:
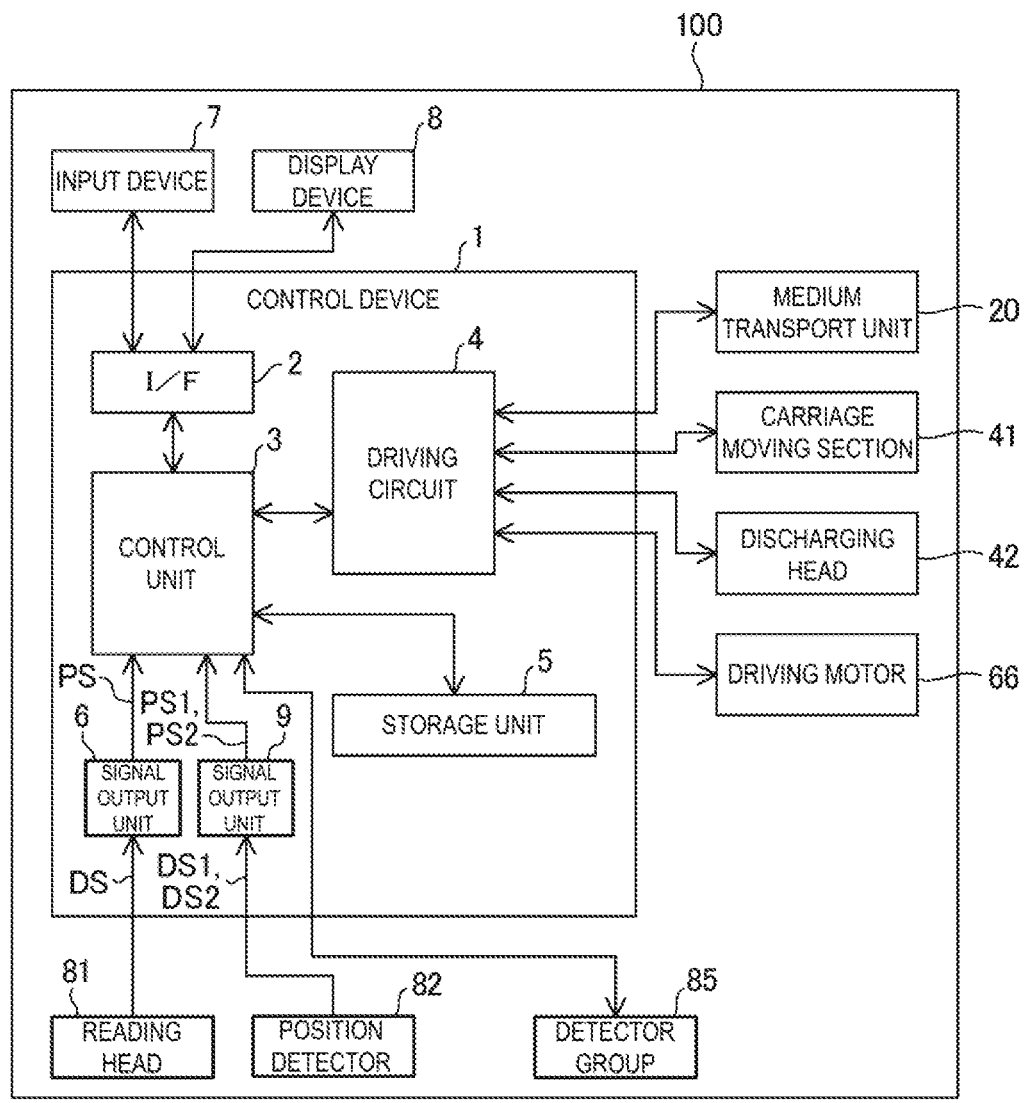
FIG. 5 is a block diagram illustrating a control system of the printing apparatus.

FIG. 5 is a block diagram illustrating a control system of the printing apparatus 100.

The printing apparatus 100 includes an input device 7 and a display device 8, and the input device 7 and the display device 8 are connected to the control device 1. The input device 7 is a device through which an operator operating the printing apparatus 100 inputs printing conditions and the like, and is an input device such as a keyboard and a mouse. The input device 7 may be a desktop-type or laptop-type personal computer, a tablet-type terminal, a portable-type terminal, or the like, and may be provided independently from the printing apparatus 100. The input device 7 outputs information input by the operator to the control device 1. The display device 8 includes a display screen such as a liquid crystal display panel, and displays various types of information in accordance with control of the control device 1.

The control device 1 includes an interface unit 2, a control unit 3, a driving circuit 4, a signal output unit 6, and a signal output unit 9. The control unit 3 includes a processor such as a CPU, and controls each part of the printing apparatus 100 in collaboration with software and hardware by executing a program by the processor. CPU is an abbreviation form of Central Processing Unit.

The interface unit 2 is connected to the input device 7 and the display device 8, and transmits and receives data between the input device 7 and the display device 8. The driving circuit 4 is connected to the medium transport unit 20, the carriage moving section 41, the ejection head 42, and a driving motor 66.

The control unit 3 controls the driving circuit 4, and causes the driving circuit 4 to output a control signal. With this, the medium transport unit 20, the carriage moving section 41, the ejection head 42, and the driving motor 66 are operated. The control unit 3 drives each motor included in the medium transport unit 20, and causes the printing medium 95 to move in the transport direction F. The control unit 3 drives a motor included in the carriage moving section 41, and causes the carriage 43 to move in the Y-axis direction. The control unit 3 drives the ejection head 42, and causes ink to be ejected onto the printing medium 95. The control unit 3 repeats main scanning and sub scanning. In the main scanning, the control unit 3 controls the carriage moving section 41 and the ejection head 42, and thus the carriage 43 is caused to move while the ejection head 42 ejects ink. In the sub scanning, the control unit 3 controls the medium transport unit 20, and thus the printing medium 95 is transported in the transport direction. With this control, an image is formed on the printing medium 95. The control unit 3 drives the driving motor 66, and causes the first cleaning brush 68 and the second cleaning brush 69. Here, a configuration in which the control device 1 is connected to each part (not shown) of the printing apparatus 100 and the control device 1 controls each part may be adopted.

The signal output unit 6 is connected to the reading head 81, and outputs a position signal PS indicating a position of the transporting belt 70, based on the detection signal DS output from the reading head 81. The position signal PS output from the signal output unit 6 may be a signal indicating an absolute position in the transport direction F, a signal indicating a relative position the transporting belt 70 at a specified timing or with respect to a specified position as a starting point, or a signal indicating a transported amount. The position signal PS output from the signal output unit 6 may be an analog signal, or digital data indicating an absolute position or a relative position of the transporting belt 70, or a transported amount.

The control unit 3 calculates a position of the transporting belt 70 in the transport direction F, based on the position signal PS output from the signal output unit 6. The transported amount obtained by the control device 1 is reflected to driving control of the medium transport unit 20.

The signal output unit 9 is connected to a position detector 82. The position detector 82 is a term for collectively indicating the roller position detector 83 and the belt position detector 84, and the position detector 82 outputs the detection signal DS1 of the roller position detector 83 and the detection signal DS2 of the belt position detector 84 the signal output unit 9. The signal output unit 9 outputs a position signal PS1 indicating a rotation position of the belt-driving roller 25, based on the detection signal DS1. The position signal PS1 may be a signal indicating a position or a rotational angle of the belt-driving roller 25 in the rotation direction, or may be a signal indicating the timing at which the roller position detector 83 detects the roller position indicator 87. The signal output unit 9 outputs a position signal PS2 of the transporting belt 70, based on the detection signal DS2. The position signal PS2 may be a signal indicating a position of the transporting belt 70 in the moving direction M or a transported amount, or may be a signal indicating the timing at which the belt position detector 84 detects the belt position indicator 88. The position signals PS1 and PS2 may be analog signals or digital data.

The position detector 82 detects a position of the belt-driving roller 25 with the roller position detector 83, and detects a position of the transporting belt 70 with the belt position detector 84. With this, relative positions of the belt-driving roller 25 and the transporting belt 70 are detected.

The control unit 3 calculates the deviation amount between the relative positions of the belt-driving roller 25 and the magnetic scale 71, based on the position signals PS1 and PS2 output from the signal output unit 9. The control unit 3 determines whether the deviation amount is a value is beyond a set range. Values in the set range being a determination reference are stored in a storage unit 5, for example.

The control device 1 is connected to a detector group 85 including other various sensors. The control unit 3 acquires detection values of the detector group 85, and reflects the detection values to control performed by the driving circuit 4.

1-5. Operation of Printing Apparatus

Figure 6:
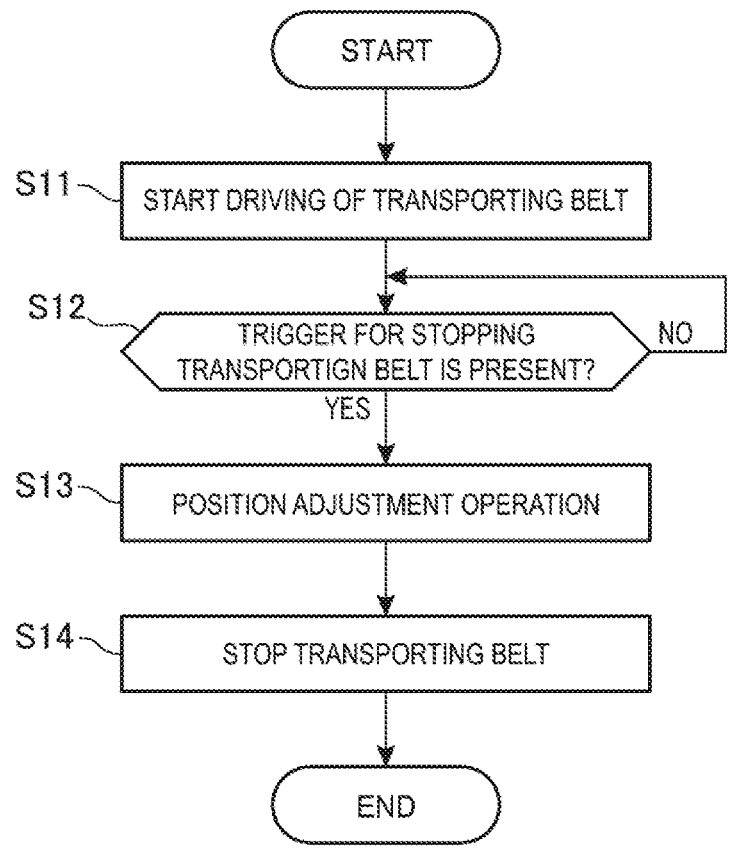
FIG. 6 is a flowchart illustrating a first operation example of the printing apparatus.
Figure 7:
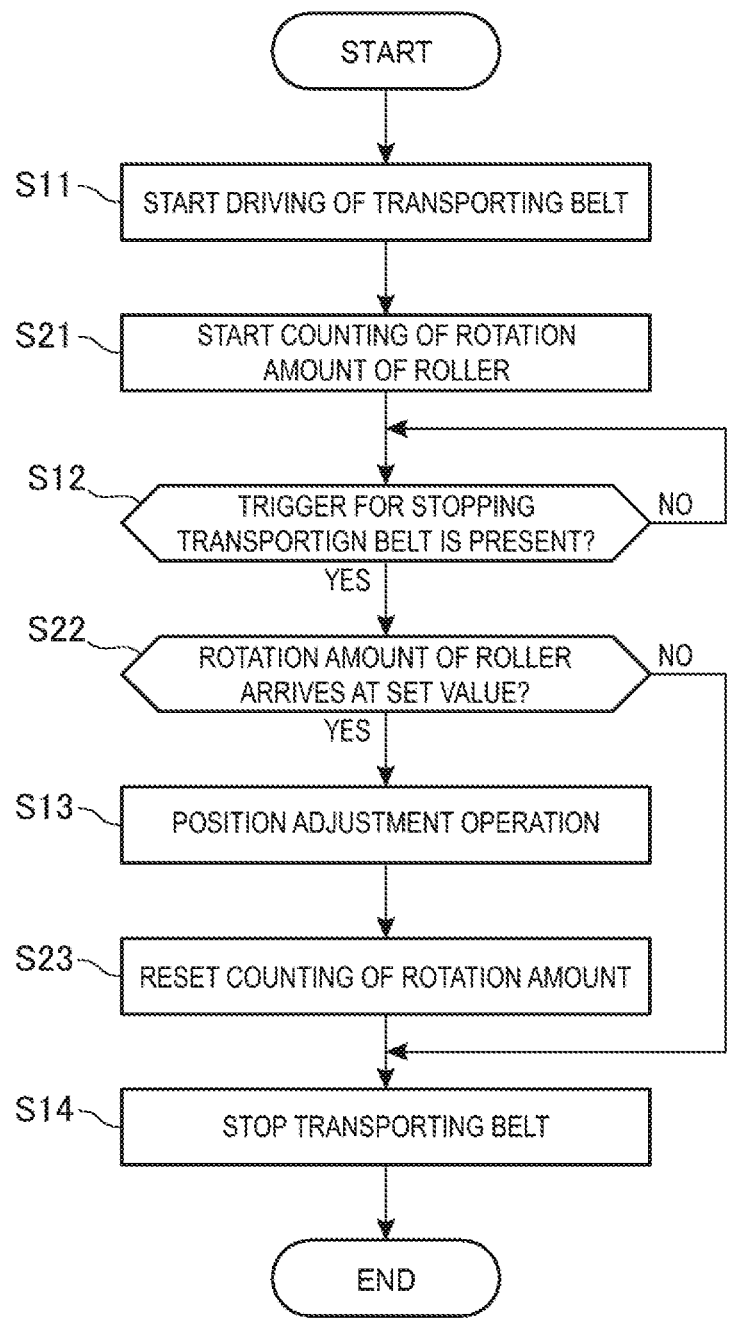
FIG. 7 is a flowchart illustrating a second operation example of the printing apparatus.
Figure 8:
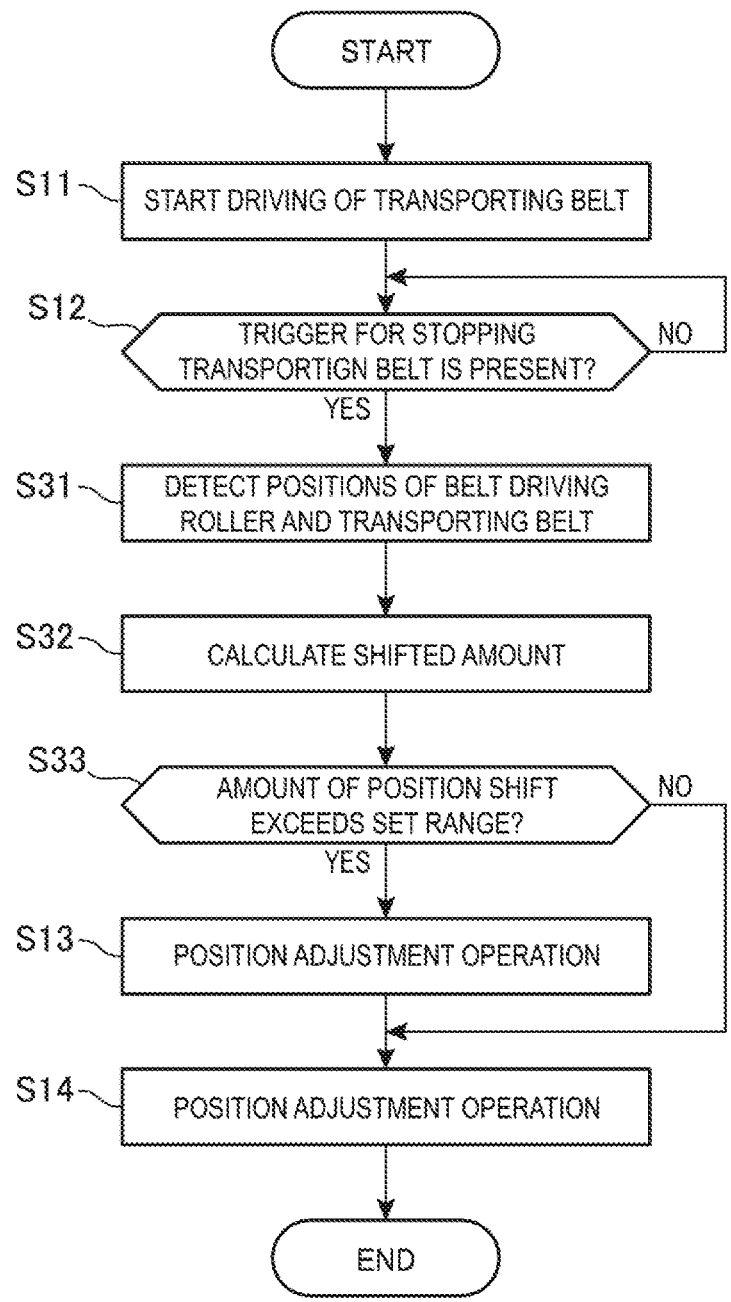
FIG. 8 is a flowchart illustrating a third operation example of the printing apparatus.

FIG. 6, FIG. 7, and FIG. 8 are flowcharts illustrating an operation of the printing apparatus 100, and illustrate an operation in which the control device 1 adjusts the position deviation between the transporting belt 70 and the belt-driving roller 25.

FIG. 6 illustrates a first operation example. In the first operation example, the control unit 3 drives the belt-driving roller 25, and starts an operation of causing the transporting belt 70 to move (Step S11), and then monitors presence or absence of a trigger for stopping the transporting belt 70 (Step S12). The trigger for stopping the transporting belt 70 indicates an instruction that is issued by the input device 7 to stop the printing apparatus 100, completion of printing instructed by the input device 7, or the like.

While the trigger for stopping the transporting belt 70 is absent (Step S12; NO), the control unit 3 continues motion of the transporting belt 70 in Step S12. When the trigger for stopping the transporting belt 70 is caused (Step S12; YES), the control unit 3 executes the position adjustment operation (Step S13), and then stops the belt-driving roller 25 (Step S14). With this, the transporting belt 70 is stopped.

The position adjustment operation is an operation of, for example, causing the belt-driving roller 25 to rotate in a direction reverse to the rotation direction R. The position deviation is caused along with rotation of the belt-driving roller 25. Thus, by causing the belt-driving roller 25 to rotate reversely, the position deviation can be reduced or canceled. A rotation amount by which the belt-driving roller 25 is caused to rotate reversely may be determined to be the same amount. Here, the rotation amount of the belt-driving roller 25 can be rephrased as the number of rotations of the belt-driving roller 25.

Further, the control device 1 may calculate the rotation amount by which the belt-driving roller 25 reversely rotates in the position adjustment operation, in accordance with a driving time of the belt-driving roller 25 in Steps S11 to S12 or the rotation amount of the belt-driving roller 25 in the rotation direction R.

Further, as the position adjustment operation, for example, the belt-driving roller 25 may be caused to rotate in the rotation direction R. In this case, the control unit 3 may control a motor for driving the belt-driving roller 25, and may cause the belt-driving roller 25 to rotate at higher speed than that during printing performed by the printing unit 40. Further, when the printing apparatus 100 includes a tensile force adjustment mechanism capable of adjusting a tensile force applied to the transporting belt 70, the belt-driving roller 25 may be caused to rotate after weakening a tensile force of the transporting belt 70.

Further, as the position adjustment operation, for example, the belt-driving roller 25 may be caused to rotate intermittently in the rotation direction R and/or in the direction reverse to the rotation direction R.

In the first operation example, every time an operation of transporting the transporting belt 70 is performed, the position adjustment operation is performed before stopping the transporting belt 70. Thus, under a state in which the position deviation between the transporting belt 70 and the belt-driving roller 25 is not increased, the position adjustment operation can be performed. Thus, frequency of the position adjustment operation is high, but increase of the position deviation can be securely prevented.

FIG. 7 illustrates a second operation example. In the second operation example and a third operation example described later, processing common to that in the first operation example is denoted with the same step number, and description thereof is omitted.

In the second operation example, the control unit 3 drives the belt-driving roller 25, and starts an operation of causing the transporting belt 70 to move (Step S11), and then starts counting of the rotation amount of the belt-driving roller 25 (Step S21). For example, the control unit 3 is capable of counting the rotation amount of the belt-driving roller 25 based on the position signal PS1. For example, the control unit 3 counts the rotation amount in the rotation direction R. Further, when the belt-driving roller 25 is caused to rotate in the direction reverse to the rotation direction R, the counted value can be reduced. Counting of the rotation amount of the belt-driving roller 25 continues until the belt-driving roller 25 is stopped as described later.

When the control unit 3 determines that the trigger for stopping the transporting belt 70 is caused (Step S12; YES), the control unit 3 determines whether the rotation amount of the belt-driving roller 25 arrives at a set value that is set in advance (Step S22). The set value is stored in the storage unit 5, for example.

When it is determined that the rotation amount of the belt-driving roller 25 does not arrive at the set value (Step S22; NO), the control unit 3 proceeds to Step S14, and stops the belt-driving roller 25. When it is determined that the rotation amount of the belt-driving roller 25 arrives at the set value (Step S22; YES), the control unit 3 executes the position adjustment operation (Step S13). The aspect of the position adjustment operation is as described in the first operation example. After executing the position adjustment operation, the control unit 3 resets the counted value of the rotation amount of the belt-driving roller 25 (Step S23), and proceeds to Step S14.

In the second operation example, every time the rotation amount of the belt-driving roller 25 arrives at the set value, the position adjustment operation is performed. Thus, increase of the position deviation between the transporting belt 70 and the belt-driving roller 25 can be managed based on the rotation amount of the belt-driving roller 25. Thus, execution frequency of the position adjustment operation can be suppressed to a necessary and sufficient degree, and can prevent increase of the position deviation.

FIG. 8 illustrates the third operation example. In the third operation example, when the control unit 3 determines that the trigger for stopping the transporting belt 70 is caused (Step S12; YES), the relative positions of the belt-driving roller 25 and the transporting belt 70 are detected based on the position signals PS1 and PS2 (Step S31). Subsequently, the control unit 3 calculates the deviation amount (Step S32).

The control unit 3 determines whether the deviation amount that is calculated exceeds the set range (Step S33). The set value is stored in the storage unit 5, for example.

When the deviation amount does not exceed the set range (Step S33; NO), the control unit 3 proceeds to Step S14, and stops the transporting belt 70. When the deviation amount exceeds the set range (Step S33; YES), the control unit 3 executes the position adjustment operation (Step S13). The aspect of the position adjustment operation is as described in the first operation example. After the position adjustment operation is executed, the control unit 3 proceeds to Step S14.

In the third operation example, the position deviation between the belt-driving roller 25 and the transporting belt 70 is obtained. When the deviation amount exceeds the set range, the position adjustment operation is executed. Thus, in accordance with a state of the position deviation between the transporting belt 70 and the belt-driving roller 25, the position adjustment operation is executed. Thus, the position adjustment operation can be executed efficiently, and increase of the position deviation can be prevented.

The control unit 3 is only required to be capable of executing any one or more of the first operation example, the second operation example, and the third operation example, and may be capable of executing a plurality of operation examples. Further, the control unit 3 may be capable of switching and executing any one of the first operation example, the second operation example, and the third operation example. For example, the control unit 3 may select and execute any one of the first operation example, the second operation example, and the third operation example in accordance with a period during which the transporting belt 70 is used in the printing apparatus 100. Further, when the control unit 3 only executes the first operation example, the printing apparatus 100 may have a configuration without the roller position detector 83, the belt position detector 84, the roller position indicator 87, and the belt position indicator 88. Further, when the control unit 3 only executes the first operation example and the second operation example, the printing apparatus 100 may have a configuration without the belt position detector 84 and the belt position indicator 88.

As described above, the printing apparatus 100 according to the exemplary embodiment to which the present disclosure is applied includes the printing unit 40 that performs printing on the printing medium 95, the transporting belt 70 that transports the printing medium 95 has an endless shape, and the belt-driving roller 25 that causes the transporting belt 70 to circulate and has a cylindrical shape. In the transporting belt 70, the magnetic scale 71 having a magnetic pole changing at a predetermined pitch is arranged along the transport direction of the printing medium 95. The belt-driving roller 25 includes the outer circumferential surface 25*c* constituted of a magnet body, and is held in contact with the transporting belt 70 on the outer circumferential surface 25*c*. The circumferential length of the outer circumferential surface 25*c* of the belt-driving roller 25 is an integer multiple of the pitch of the magnetic scale 71.

With this configuration, even when the belt-driving roller 25 rotates, the relative positional relationship between the magnetic bodies 71*a* and 71*b* of the magnetic scale 71 and the first magnetic part 25*a* and the second magnetic part 25*b* that are magnetized due to a magnetic force of the magnetic scale 71 is maintained. Thus, a magnetic force of the first magnetic part 25*a* and/or the second magnetic part 25*b* can suppress or prevent the magnetic forces of the magnetic bodies 71*a* and 71*b* from being weakened. Thus, in a configuration of detection a position of the transporting belt 70 through use of the magnetic scale 71, degradation of detection accuracy can be prevented for a long time period.

Further, the printing apparatus 100 includes the printing unit 40 that performs printing on the printing medium 95, the transporting belt 70 that transports the printing medium 95 and has an endless shape, and the belt-driving roller 25 that causes the transporting belt 70 to circulate and has a cylindrical shape. In the transporting belt 70, the magnetic scale 71 having a magnetic pole changing at a predetermined pitch is arranged along the transport direction of the printing medium 95. The belt-driving roller 25 includes the outer circumferential surface 25c constituted of a magnet body, and is held in contact with the transporting belt 70 on the outer circumferential surface 25c. The printing apparatus 100 satisfies Expression (1) given below when the pitch of the magnetic scale 71 is P.

$$P = p \cdot q \quad (1)$$

Note that, in Expression (1) given above, p is a positive integer, and q is an approximate value of the number n.

With this configuration, even when the belt-driving roller 25 rotates, the relative positional relationship between the magnetic bodies 71a and 71b of the magnetic scale 71 and the first magnetic part 25a and the second magnetic part 25b that are magnetized due to a magnetic force of the magnetic scale 71 is maintained. Thus, a magnetic force of the first magnetic part 25a and/or the second magnetic part 25b can suppress or prevent the magnetic forces of the magnetic bodies 71a and 71b from being weakened. Thus, in a configuration of detection a position of the transporting belt 70 through use of the magnetic scale 71, degradation of detection accuracy can be prevented for a long time period.

The printing apparatus 100 includes the control unit 3 that controls an operation of the belt-driving roller 25. When the transporting belt 70 is stopped, the control unit 3 executes the position adjustment operation for adjusting the relative positions of the outer circumferential surface 25c of the belt-driving roller 25 and the transporting belt 70, and then stops the belt-driving roller 25. Thus, when the position deviation is caused between the relative positions of the transporting belt 70 and the belt-driving roller 25 along with an operation of the printing apparatus 100, increase of the position deviation can be suppressed. Thus, through use of the magnetic scale 71, the position of the transporting belt 70 can be detected with high accuracy.

The printing apparatus 100 includes the belt position indicator 88 that indicates a position of the transporting belt 70 in the transport direction and the roller position indicator 87 that indicates a position of the belt-driving roller 25 in the rotation direction. The printing apparatus 100 includes the position detector 82 that detects the relative positions of the belt position indicator 88 and the roller position indicator 87.

With this configuration, when the position deviation is caused along with an operation of the printing apparatus 100, the position deviation can be detected by the position detector 82. For example, the position adjustment operation is executed in accordance with the position deviation. With this, when the position deviation is caused between the relative positions of the transporting belt 70 and the belt-driving roller 25 along with an operation of the printing apparatus 100, increase of the position deviation can be suppressed. Thus, in a configuration of detection a position of the transporting belt 70 through use of the magnetic scale 71, degradation of detection accuracy can be prevented.

The control unit 3 executes the position adjustment operation, based on the detection result of the position detector 82. Thus, when the position deviation between the relative positions of the transporting belt 70 and the belt-driving roller 25 is caused, increase of the position deviation can be suppressed. Further, in accordance with an occurrence condition of the position deviation, the position adjustment operation is executed. Thus, the position deviation can be corrected or canceled efficiently, and degradation of detection accuracy can be prevented.

Based on the detection result of the position detector 82, the control unit 3 obtains the deviation amount between the relative positions of the belt position indicator 88 and the roller position indicator 87. When the deviation amount between the relative positions exceeds the set range, the position adjustment operation is executed. With this, in accordance with an occurrence condition of the position deviation, the position adjustment operation is executed. Thus, the position deviation can be corrected or canceled efficiently, and degradation of detection accuracy can be prevented.

In the position adjustment operation, the control unit 3 may obtain a moving amount for correcting the relative positions of the outer circumferential surface 25c of the belt-driving roller 25 and the transporting belt 70, and may cause the transporting belt 70 to move by the obtained moving amount. For example, when the position adjustment operation is executed, the rotation amount by which the belt-driving roller 25 is caused to rotate in the position adjustment operation may be determined based on operation history of the belt-driving roller 25, a cumulative rotation amount, or the like. In this case, the position adjustment operation can be performed based on a predictive value indicating a condition of the position deviation between the transporting belt 70 and the belt-driving roller 25, and the position deviation can be corrected or canceled.

Further, the printing apparatus 100 includes the printing unit 40 that performs printing on the printing medium 95, and the transporting belt 70 that transports the printing medium 95 and has an endless shape. The printing apparatus 100 includes the belt-driving roller 25 in a cylindrical shape. The belt-driving roller 25 includes the outer circumferential surface 25c constituted of a magnetic body, is held in contact with the transporting belt 70 on the outer circumferential surface 25c, and causes the transporting belt 70 to circulate. The control unit 3 that controls an operation of the belt-driving roller 25 is included. In the transporting belt 70, the magnetic scale 71 having a magnetic pole changing at a predetermined pitch is arranged along the transport direction of the printing medium 95. When the transporting belt 70 is stopped, the control unit 3 executes the position adjustment operation for adjusting the relative positions of the outer circumferential surface 25c of the belt-driving roller 25 and the transporting belt 70, and then stops the belt-driving roller 25.

Further, in the control method executed by the printing apparatus 100, when the transporting belt 70 is stopped, the position adjustment operation for adjusting the relative positions of the outer circumferential surface 25c of the belt-driving roller 25 and the transporting belt 70 is executed, and then the transporting belt 70 is stopped.

According to the printing apparatus 100 and the control method executed by the printing apparatus 100, when the position deviation is caused between the relative positions of the transporting belt 70 and the belt-driving roller 25 along with an operation of the printing apparatus 100, increase of the position deviation can be suppressed. Thus, through use of the magnetic scale 71, the position of the transporting belt 70 can be detected with high accuracy.

2. Other Exemplary Embodiments

In each exemplary embodiment described above is merely a specific example to which the present disclosure is applied.

The present disclosure is not limited to the configurations in the exemplary embodiments described above, and can be implemented in various aspects without departing from the gist of the disclosure.

For example, in the printing apparatus 100, the mechanism that transports the transporting belt 70 is not limited to the configuration described in the exemplary embodiment described above, and the number and arrangement of rollers and motors are freely selected. In this configuration, when a plurality of rollers each of which has a surface being held in contact with the transporting belt 70 and being constituted of a magnetic body are present including the belt-driving roller 25, a circumferential length of an outer circumferential surface of each roller is preferably an integer multiple of the pitch P, similarly to the belt-driving roller 25.

In the exemplary embodiment described above, an example in which the printing apparatus 100 includes the belt position detector 84 as a configuration of detecting a position of the transporting belt 70 is described. For example, a position of the transporting belt 70 can be detected through use of the reading head 81. Further, the configuration of detecting a position of the belt-driving roller 25 in the rotation direction R is not limited to the configuration using the roller position indicator 87 and the roller position detector 83. For example, a rotational angle sensor or a rotary encoder that detects a rotational angle of the belt-driving roller 25 may be used.

Further, at least some of the function blocks illustrated in FIG. 5 may be achieved with hardware, or achieved in collaboration with hardware and software.

What is claimed is:

1. A printing apparatus, comprising:
   a printing unit configured to perform printing on a printing medium;
   a transporting belt configured to transport the printing medium, the transporting belt having an endless shape; and
   a roller configured to circulate the transporting belt, the roller having a cylindrical shape, wherein
   a magnetic scale is arranged at the transporting belt along a transport direction of the printing medium, the magnetic scale having a magnetic pole changing at a predetermined pitch,
   the roller has an outer circumferential surface constituted of a magnetic body, and is in contact with the transporting belt at the outer circumferential surface, and
   a circumferential length of the outer circumferential surface of the roller is an integer multiple of the pitch of the magnetic scale.

2. The printing apparatus according to claim 1, comprising:
   a control unit configured to control an operation of the roller, wherein
   when the transporting belt is stopped, the control unit executes a position adjustment operation for adjusting relative positions of the outer circumferential surface of the roller and the transporting belt, and then stops the roller.

3. The printing apparatus according to claim 2, comprising:
   a belt position indicator configured to indicate a position of the transporting belt in the transport direction;
   a roller position indicator configured to indicate a position of the roller in a rotation direction thereof; and
   a position detector configured to detect relative positions of the belt position indicator and the roller position indicator.

4. The printing apparatus according to claim 3, wherein the control unit executes the position adjustment operation, based on a detection result of the position detector.

5. The printing apparatus according to claim 4, wherein the control unit obtains a deviation amount between the relative positions of the belt position indicator and the roller position indicator, based on a detection result of the position detector, and executes the position adjustment operation when the deviation amount exceeds a set range.

6. The printing apparatus according to claim 2, wherein the control unit obtains a moving amount for correcting the relative positions of the outer circumferential surface of the roller and the transporting belt in the position adjustment operation, and causes the transporting belt to move by the obtained moving amount.

* * * * *